US012359498B2

(12) United States Patent
Magro et al.

(10) Patent No.: US 12,359,498 B2
(45) Date of Patent: Jul. 15, 2025

(54) METHOD OF FORMING A MAINTENANCE-FREE ROLLING DOOR VACUUM SLAT

(71) Applicant: Alpine Overhead Doors, Inc., East Setauket, NY (US)

(72) Inventors: Michael Magro, Stony Brook, NY (US); Sebastian Magro, Stony Brook, NY (US)

(73) Assignee: ALPINE OVERHEAD DOORS, INC., East Setauket, NY (US)

( * ) Notice: Subject to any disclaimer, the term of this patent is extended or adjusted under 35 U.S.C. 154(b) by 0 days.

(21) Appl. No.: 18/421,569

(22) Filed: Jan. 24, 2024

(65) Prior Publication Data

US 2024/0175313 A1 May 30, 2024

Related U.S. Application Data

(62) Division of application No. 17/734,855, filed on May 2, 2022, now Pat. No. 11,913,279.

(51) Int. Cl.
*E06B 9/15* (2006.01)
*E06B 9/17* (2006.01)

(52) U.S. Cl.
CPC .................. *E06B 9/15* (2013.01); *E06B 9/17* (2013.01); *E06B 9/17076* (2013.01); *E06B 2009/1505* (2013.01); *E06B 2009/17069* (2013.01); *E06B 2009/17092* (2013.01)

(58) Field of Classification Search
CPC .......... E06B 9/15; E06B 9/17; E06B 9/17076; E06B 2009/1505; E06B 2009/17069; E06B 2009/17092; E06B 2009/1516; E06B 3/6612; E04B 1/803
See application file for complete search history.

(56) References Cited

U.S. PATENT DOCUMENTS

| | | | | |
|---|---|---|---|---|
| 11,155,497 | B2 * | 10/2021 | Park | E06B 3/6733 |
| 2008/0245011 | A1 * | 10/2008 | Friedl | E06B 3/6775 52/745.19 |
| 2011/0296771 | A1 * | 12/2011 | Miller | B32B 37/1284 52/204.593 |
| 2012/0279170 | A1 * | 11/2012 | Francis, IV | B23K 1/06 52/786.13 |
| 2013/0140347 | A1 * | 6/2013 | Friedl | E06B 3/67334 228/111.5 |
| 2021/0246713 | A1 * | 8/2021 | Kozisek | E06B 3/485 |
| 2022/0235601 | A1 * | 7/2022 | Krisko | E06B 3/6612 |
| 2022/0371312 | A1 * | 11/2022 | Uriu | B32B 17/1044 |

* cited by examiner

*Primary Examiner* — Abe Massad
(74) *Attorney, Agent, or Firm* — Nolte Lackenbach Siegel; Myron Greenspan

(57) ABSTRACT

A method of forming maintenance-free rolling door vacuum slats includes an elongate tubular member forming a cavity with a substantially uniform cross-sectional configuration along its length and forming first and second opposing ends conforming to the cross-sectional configuration. A first cap seals the first end. A second cap seals the second end, a vacuum being formed within the cavity. The first and second caps are joined to the elongate member to form a hermetic seals to render the slat airtight forming a permanent vacuum insulation barrier that requires no maintenance to restore the vacuum within the cavity.

13 Claims, 12 Drawing Sheets

METHOD OF FORMING A MAINTENANCE-FREE ROLLING DOOR VACUUM SLAT

CROSS-REFERENCE TO RELATED APPLICATION

This application is a divisional application claiming filing priority to U.S. patent application Ser. No. 17/734,855 filed May 2, 2022 (U.S. Pat. No. 11,913,279 granted Feb. 27, 2024), the contents of which is incorporated as if fully set forth herein.

FIELD OF THE INVENTION

The invention generally relates to rolling doors and, more specifically, to methods of forming maintenance-free rolling door vacuum slats.

DESCRIPTION OF THE PRIOR ART

Rolling doors have and continue to be used in a variety of applications. They include such categories as: storm doors; fire and smoke doors; air-leakage doors, counter shutters and the like. What they have in common is a construction that allows them to be rolled up onto a drum, tube or shaft when in the open position or, to be unreeled when the door is being lowered. These doors are typically used in commercial establishments to seal or close off large doorways, or bays, and can be operated electrically, manually or both. Rolling doors are typically formed of a series of long elongate slats that are hingedly coupled or linked to each other.

The interlocking horizontal slats, when lifted, travel along a track and coil around a drum directly overhead. The slats on coiling doors are much shorter than those of sectional doors.

Slats are frequently elongate hollow members closed by mechanical components that serve one or more functions including guiding the slats along tracks or guides. However, slats are typically filled with air or, in some cases, filled with thermal insulation materials such as foam. However, they are normally thermally conductive and have low R-values below 11.

U.S. Pat. No. 5,419,386 discloses a metal slats that include plastic insulation members. Such slats are normally open at opposing ends or have those ends closed by a mechanical component. Such slats seek to provide insulation properties but still have low R-values.

In DE202008003113 vacuum-insulated shutters are disclosed that include an insulating element filled with a mineral or other material surrounded by a gas tight and diffusion tight material from which air has been permanently evacuated. The inserted insulating element can be removed from the roller shutter element. Only the insulating element is purged of air.

DE102005013414 discloses shutters made from vacuum insulation panels that are made up of micro-porous silicon oxide with a casing made from metallized high pressure-tight plastic foil that may be filled with a heat insulation. Each of the panels may have, at both ends, a clamp or a clip equipped with a cord strap or hook guide that firmly holds the panel such that all panels form, together, a shutter that can be adjusted either by hand or electrically. The entire shutter may be processed in a plastic foil that has only soft insulation.

CN209523681U discloses a Sound-insulation heat-insulation fireproof device for a cabin. The utility model discloses a kind of sound-insulating and heat-insulating firebreak device for a cabin, including a machinery space bulkhead and rolling screen door, rolling screen door wrapped on spool arranged above a machinery space bulkhead.

The sound-insulating and heat-insulating firebreak device of the utility model, rolling screen door can absorb noise and the vibration of machinery to improve ship comfort level, when machinery does not work. Multiple vacuum layers are used by the vacuum insulation panel to provide the functions of sound-insulating and heat-insulating fireproof purpose of the cabin.

CN209637598U discloses a Fireproof roller shutter door that includes a vacuum chamber of thermal insulation, fire resisting material particles filling the vacuum chamber.

DE102012000722A1 includes a valve used to remove air from a shutter box insulation to create a vacuum. However, that arrangement involves a pump that removes air and therefore requires periodic maintenance.

SUMMARY OF THE INVENTION

It is an object of the invention to provide a method of creating a vacuum slat that does not have the disadvantages inherent in prior art slats.

It is another object of the invention to provide a method of forming a slat for a rolling door that has improved thermal insulating R-values.

It is still another object of the invention to provide a method of forming a vacuum slat for a rolling door that is simple in construction and inexpensive to manufacture.

It is yet another object of the invention to provide a method of forming a vacuum slat that has R-values greater than existing insulating slats without needing periodic maintenance to maintain desired levels of vacuum within the slats.

In order to achieve the above objects, as well as others that will become evident hereinafter, a method of forming a maintenance-free rolling door vacuum slat comprises the steps of forming an elongate member having a cavity with a substantially uniform cross-sectional configuration along its length and having first and second opposing ends conforming to said cross-sectional configuration; closing said first end with a first cap; closing said second end with a second cap; evacuating air from said cavity to form a vacuum within said cavity, said first and second caps being joined to said elongate member to form hermetic seals to render the slat airtight, whereby a permanent vacuum insulation barrier is formed between said spaced opposing walls that requires no maintenance to restore the vacuum within said slat Another feature of the invention is to provide a method of forming a maintenance-free rolling door vacuum slat comprising the steps of placing an elongate member formed with a cavity with a substantially uniform cross-sectional configuration along its length and having first and second opposing ends conforming to said cross-sectional configuration within an enclosed chamber; sealing said first end with a first cap; expelling air from said enclosed chamber to form a vacuum within said enclosed chamber and within said cavity; sealing said second end with a second cap while said vacuum exists within said cavity, said first and second caps being joined to said elongate member to form hermetic seals to render the slat airtight; and removing said elongate member from said enclosed chamber, whereby a vacuum insulation barrier is formed within said cavity.

BRIEF DESCRIPTION OF THE DRAWINGS

The following descriptions are in reference to the accompanying drawings in which the same or similar parts are designated by the same numerals throughout the several drawings, and wherein.

DETAILED DESCRIPTION

Figure 1:
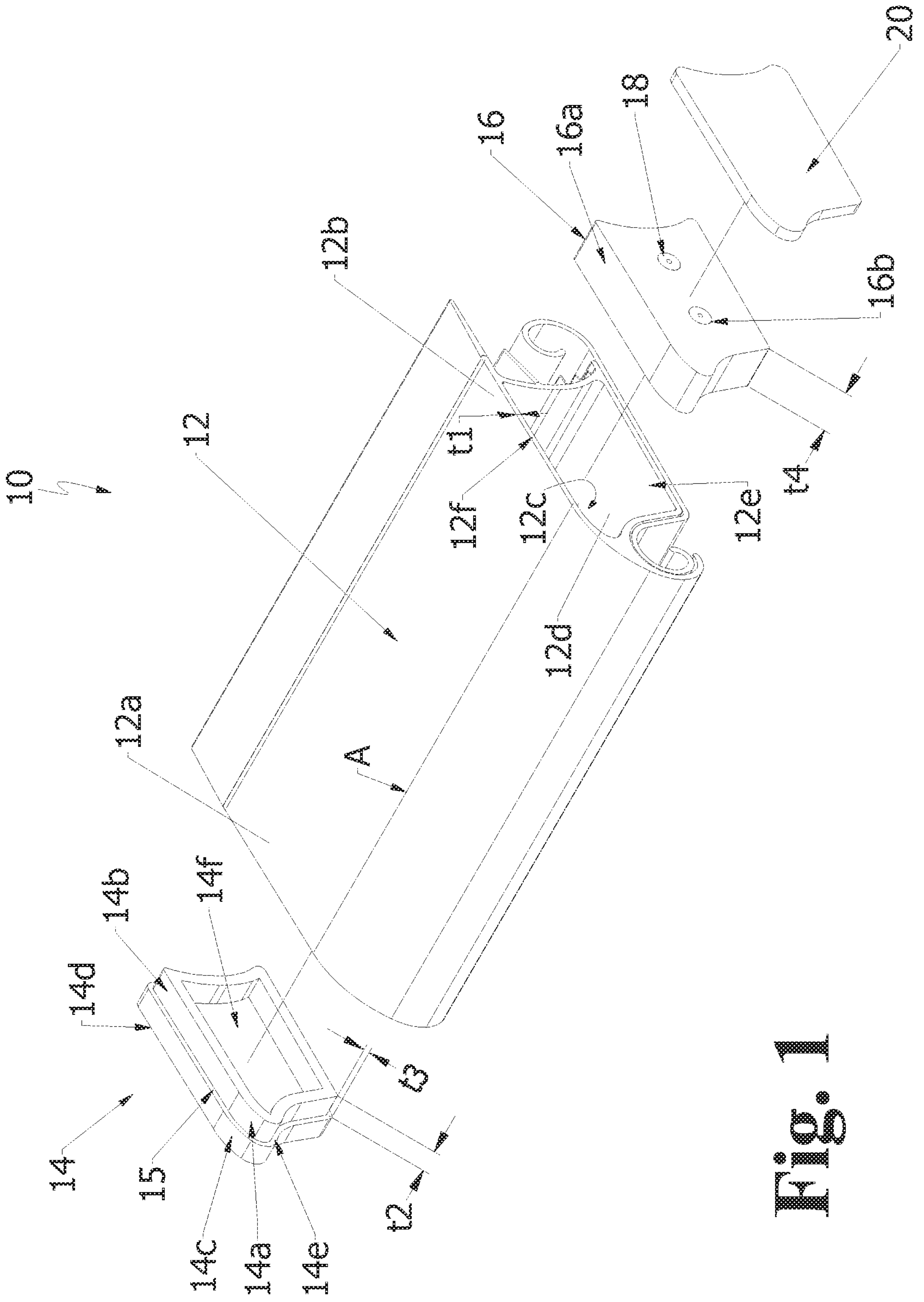
FIG. 1 is an exploded perspective view of a rolling door slat in accordance with the invention.
Figure 2:
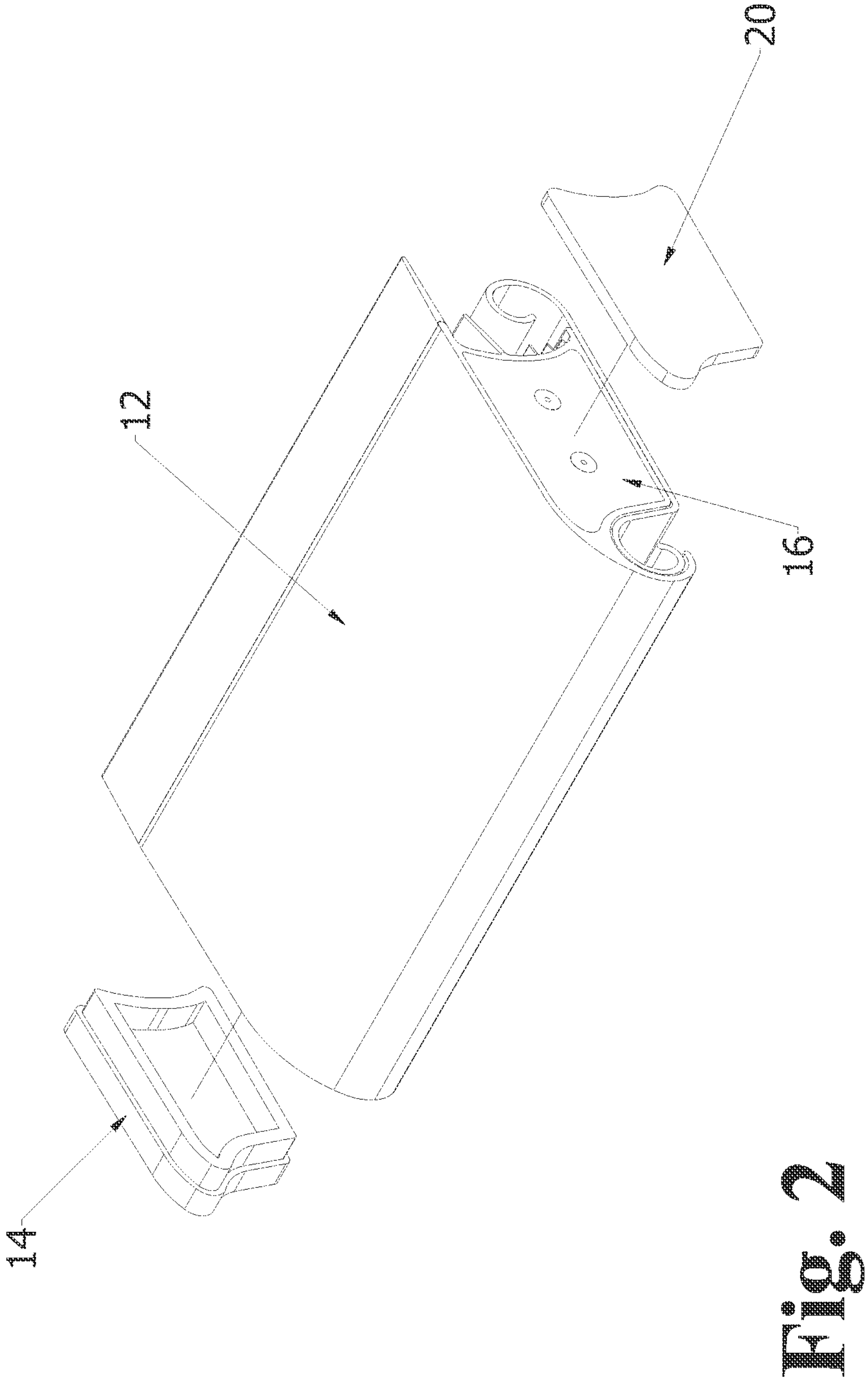
FIG. 2 is similar to FIG. 1 but shows the slat partially assembled.
Figure 3:
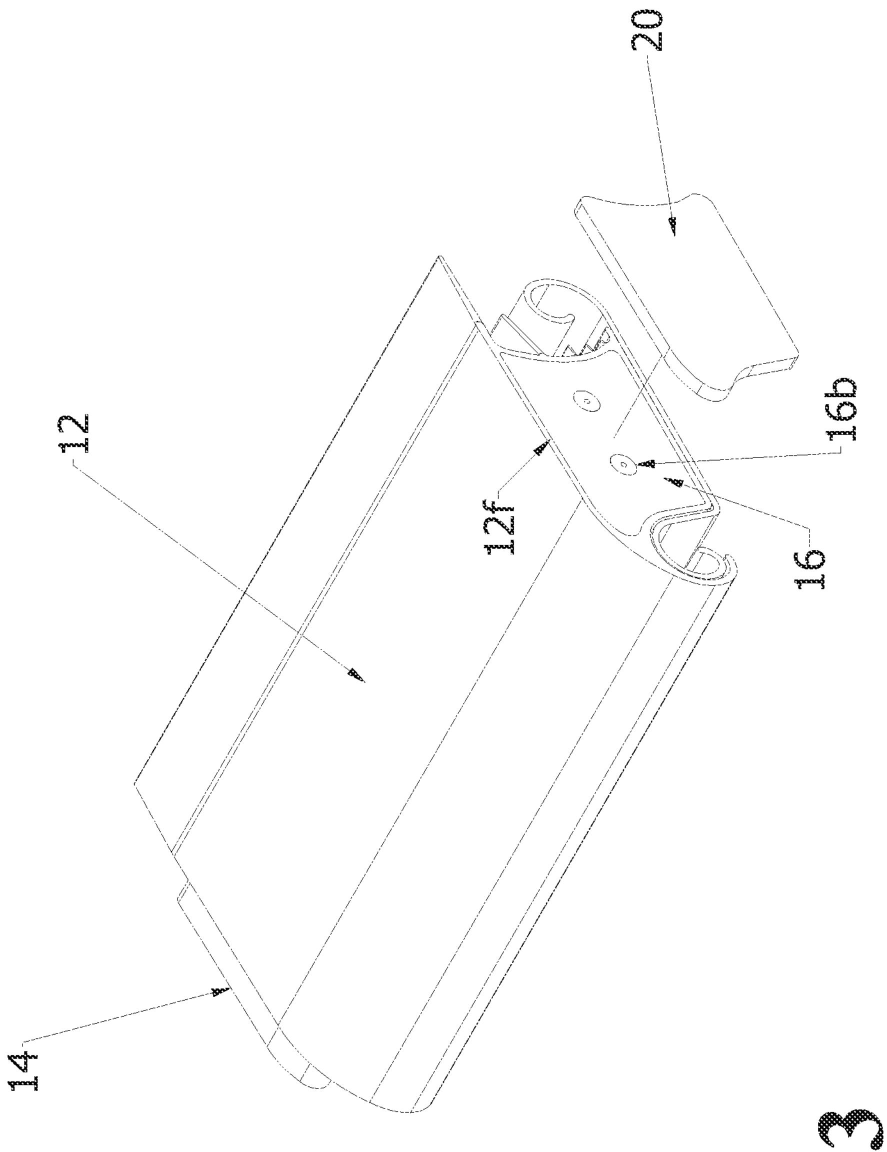
FIG. 3 is a perspective view of the slat shown in FIGS. 1 and 2 but shows one assembled closed end of the slat.

Referring now to the figures, in which identical or similar parts are designated by the same reference numerals throughout, and first referring to FIG. 1, a slat in accordance with the present invention is generally designated by the reference numeral 10.

The slat 10 in accordance with the invention includes an elongated extruded profile 12 that can be formed of any suitable metal or plastic that is generally rigid and may withstand deformations under pressure—positive or negative. Typically, such slats are formed of metal and the extruded profiles can be similar to those currently used in the rolling door industry. The extruded profile 12 defines an axis A and has a predetermined length and opposing ends 12*a*, 12*b* and an elongate cavity 12*c* that has a uniform cross-section between the ends, providing openings 12*d* at each of the ends that have the same size and shape configuration as the uniform cross-section of the extruded profile. The cavity 12*c* has an internal surface 12*e* and a lateral edge surface 12*f* at each end. While the lateral edge surface 12*f* may vary over the perimeter encircling the openings 12*d* the minimum thickness of the walls is t1. A feature of the invention is that when fully assembled openings 12*d* are hermetically and permanently sealed. When a vacuum is created within the cavity 12*c* the hermetic seals maintain the vacuum within the slat 10 indefinitely without the need of maintenance or periodic purging of air that may otherwise enter the slat and degrade the insulative properties or R-value of the slat.

In FIG. 1 the slat 10 includes a first cap or cover 14 that includes a first portion 14*a* that has an exterior surface 14*b* that generally simulates or conforms to the size and shape of the internal surface 12*e* and has an axial thickness t2. The cover 14 includes a second portion 14*c* that forms an exterior surface 14*d* and is incrementally larger than portion 14*a* to create a peripheral step or ledge 15 that forms an incremental peripheral surface area 14*e* over a thickness t2 that corresponds to the lateral edge surface 12*f*. The axially remote or outwardly facing surface of the second portion 14*c* is closed by a wall 14*f*. The portion 14*a* is receivable within the opening 12*d* at the first end 12*a* with little or no clearance. When the entire axial length or thickness t1 is received within the cavity 12*c* the incremental surface area 14*e* abuts against the lateral edge surface 12*f* at the opening 12*d* at the end 12*a*. The first end cover 14 is fixedly secured to the extruded profile 12 in any suitable or conventional manner, such as welding and adhesive, to provide a full and permanent seal or hermetic closure at the first end 12*a*. It will be clear that the specific manner of closing and permanently sealing the first end 12*a* is not critical and any cap or cover and sealing technique may be used as long as a permanent hermetic seal is formed at the first end.

Figure 4:
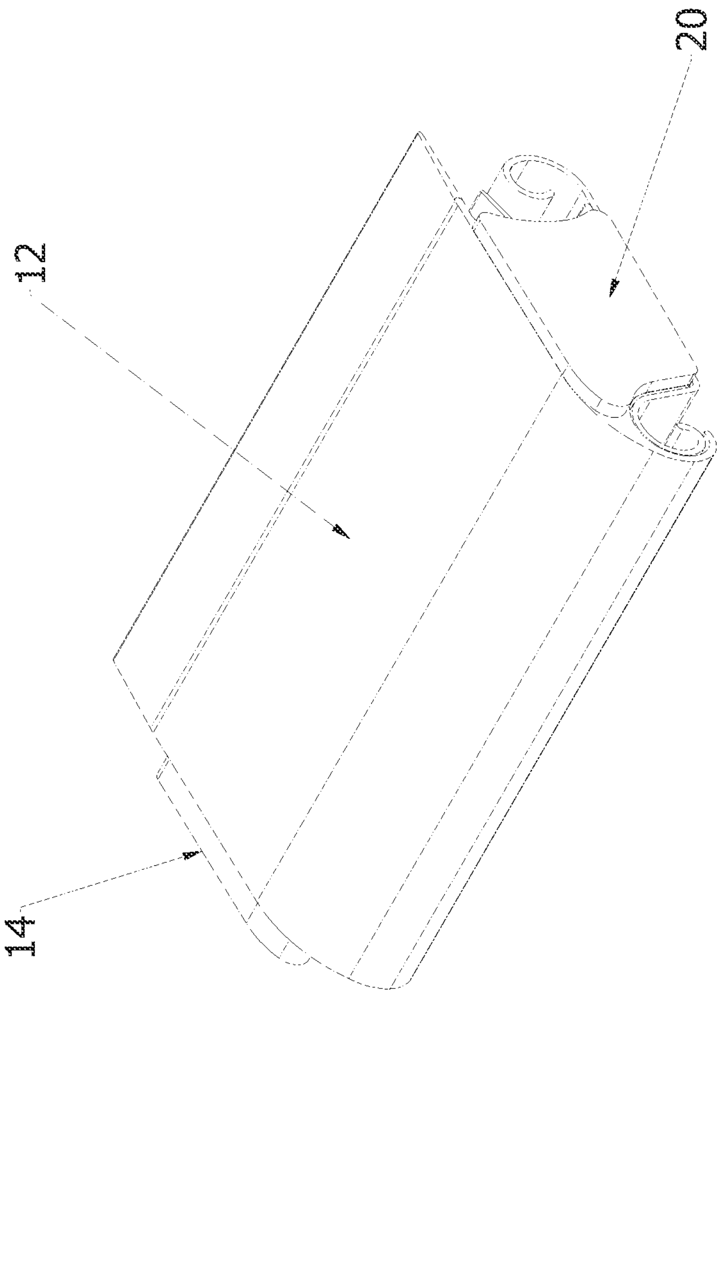
FIG. 4 is similar to FIG. 2 shown with the end cover or cap shown in FIG. 3 inserted within the slat cavity.

A second end cover 16 has a thickness t4 and is sized and shaped to be received within the cavity 12*c* through the opening 12*d* at the second end 12*b* and has an external surface 16*a* that conforms to the internal surface 12*e* with little or no clearance. In the embodiment shown in FIG. 1 the second end cover 16 includes at least one hole or aperture 16*b* that extends through the thickness t4 and a rubber valve 18, such as a sports ball valve disclosed in U.S. Published Patent Application No. 2006/0264278 A1. Once both end covers 14, 16 are fully inserted at the opposing ends of the extruded profile 12, as shown in FIG. 4, and secured to provide hermetic seals by any suitable or conventional means, the air within the cavity 12*c* is purged by inserting air needles (not shown) into the rubber valve(s) and the air removed by any suitable vacuum pump. Once the air has been purged or removed the air needle is removed from the valve(s) and a solid cover plate 20 dimensioned and configured to conform to the lateral edge surface 12*f* is secured along the lateral edge surface 12*f* to provide a hermetic seal to prevent air from re-entering the extruded profile 12 through the rubber valve(s) 18 that may be less than 100% efficient in blocking air flow therethrough. Even minute leakages through the valves could, in time, compromise the level of vacuum within the slat and, therefore, the level of thermal insulation. By providing permanent hermetic seals at both ends of the extruded profile 12 after air has been evacuated from the slat the desired level of vacuum and insulation of the slat is insured to continue indefinitely. Using the invention has increased the R-value of the slats to the range of 30-40 without the need to maintain the desired levels of vacuum by periodically purging air from the slats that may seep in over time.

Figure 4A:
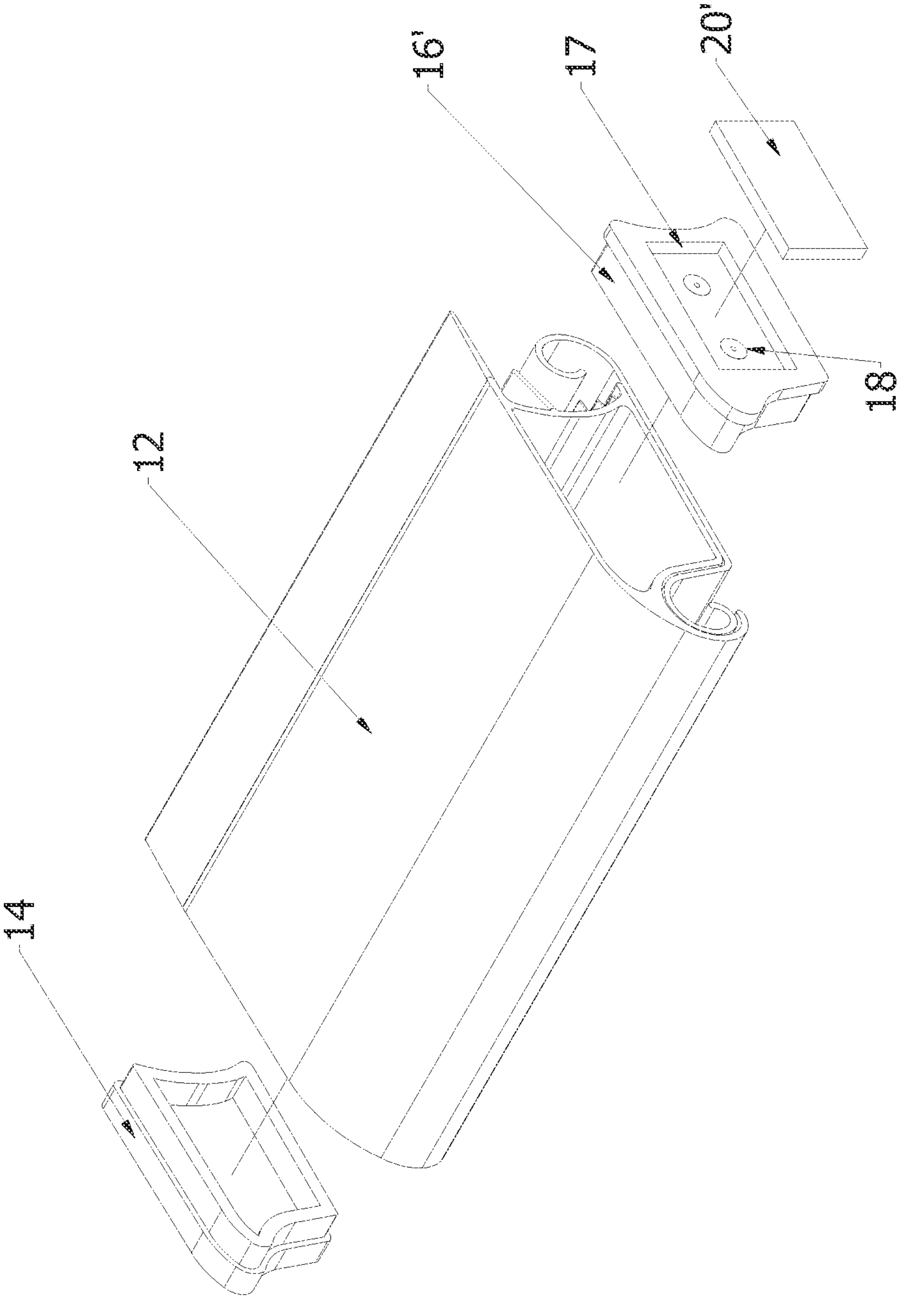
FIG. 4*a* is similar to FIG. 4 with a modified second closure or end cap.
Figure 4B:
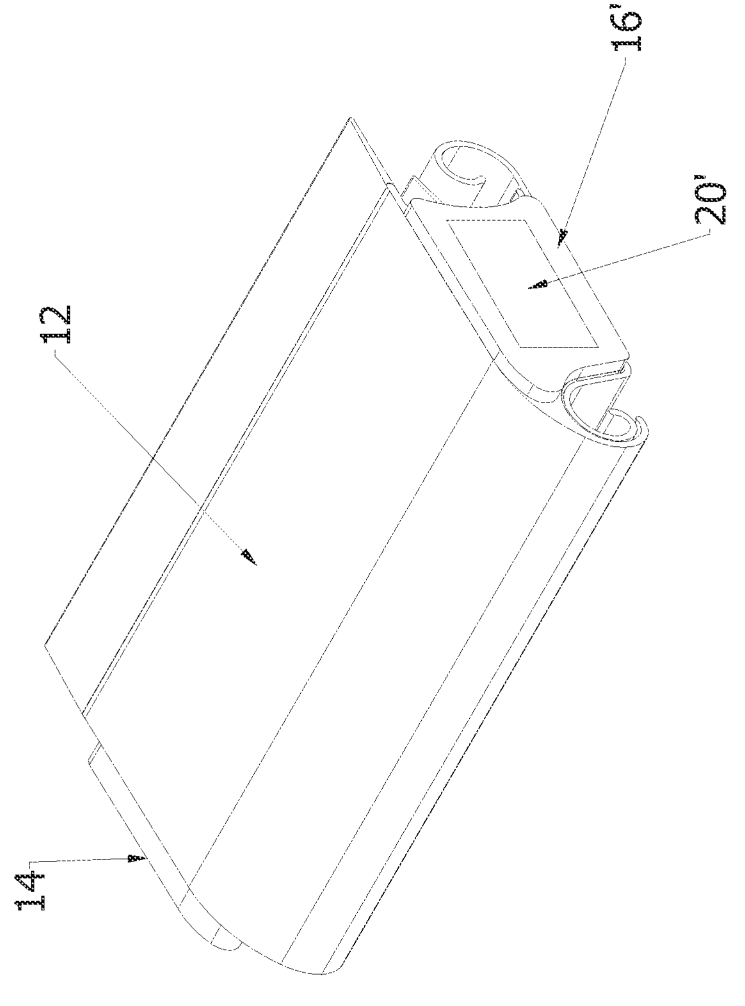
FIG. 4*b* is similar to FIG. 4*a* with the solid cover plate assembled to the end cap.

FIGS. 4*a* and 4*b* illustrate another embodiment with a modified second end cover 16' that includes a recessed window 17 in which the rubber valves 18 are mounted. A modified solid cover plate 20' is dimensioned to be received within the window 17 to hermitically seal the slat 10.

Figure 5:
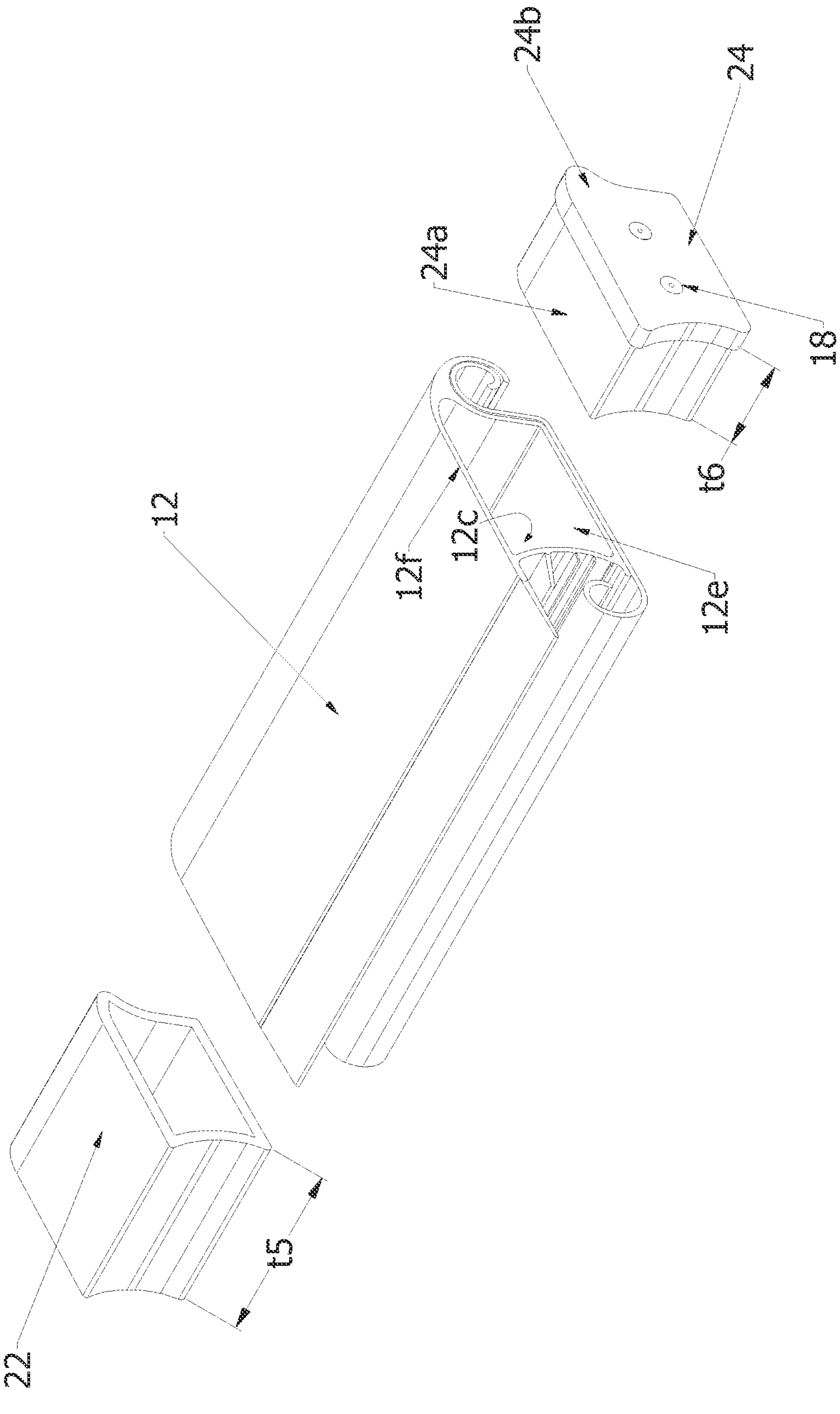
FIG. 5 is similar to FIG. 1 but show another embodiment of the slat.

FIG. 5 illustrates a further embodiment of the invention in which the first end cover 22 has an axial length t5 greater than t2 and, like the end cover 14, is hermetically sealed at the first end 12*a*. The second end cover 24 includes an integrally formed first portion 24*a* that has an axial length t6 that is receivable within the cavity 12*c* and a second portion 24*b* that includes the rubber valve(s) 18. It will be clear that the axial lengths of the covers at both ends is not critical as long as the covers have surfaces that abut the internal surface 12*e* with little or no clearance, or even interference fits between the surfaces and are permanently hermetically sealed to insure that there is no possibility of air leakage into the slat once a desired level of vacuum is formed therein. With the embodiment of FIG. 5 another solid cover plate, such as the plate 20 in FIG. 1, would need to seal the rubber valves 18 to insure that no air exchange takes place though the valve(s) once desired levels of vacuum have been formed within the slat. While solid cover plates have been used to create the hermetic seals it should be clear that any other known or conventional means may be used to achieve permanent hermetic seals at both ends of the slat.

Figure 6:
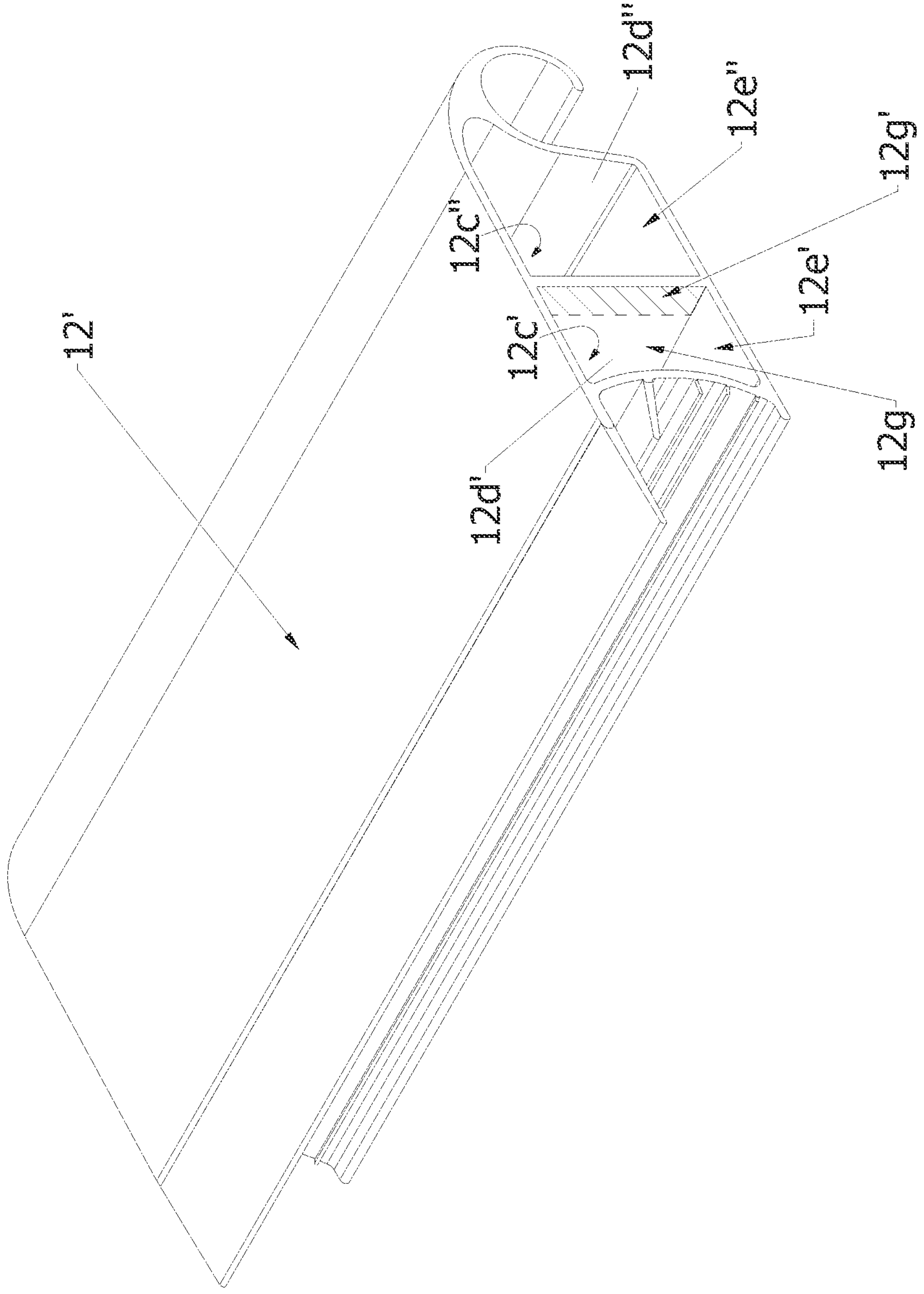
FIG. 6 is a perspective view of an extrusion of a slat that includes a reinforcing rib or wall.

FIG. 6 illustrates a modified extrusion profile 12' that includes a reinforcing wall or rib 12*g* to prevent collapse or deformation of the extrusion due to external pressure acting on the relatively thin walls after a vacuum is formed within the slat. The rib or wall 12*g* forms two parallel cavities 12*c*' and 12*c*'' each defined by internal surfaces 12*e*', 12*e*''. Since the rib or wall 12*g* is formed during extrusion of the other walls it also extends into the planes of the openings 12*d*', 12*d*'' preventing insertion of the covers into the cavity 12*c* as aforementioned. Thus, either the portions 14*a*, 22 and 24*a* need to be slotted to receive the rib or wall 12*g* to allow insertion of the end covers or a portion 12*g*' of the rib or wall needs to be removed to allow receipt of the end covers. It will be clear that when the wall or rib 12*g* is provided it creates two separate and distinct cavities 12*c*' and 12*c*''. Once the end caps 16, 24 are hermetically attached to the extruded profile the number of rubber valves 18 will be equal to the number of cavities 12*c* created by the reinforcing ribs or walls so that air can be evacuated from each of the cavities.

Figure 7:
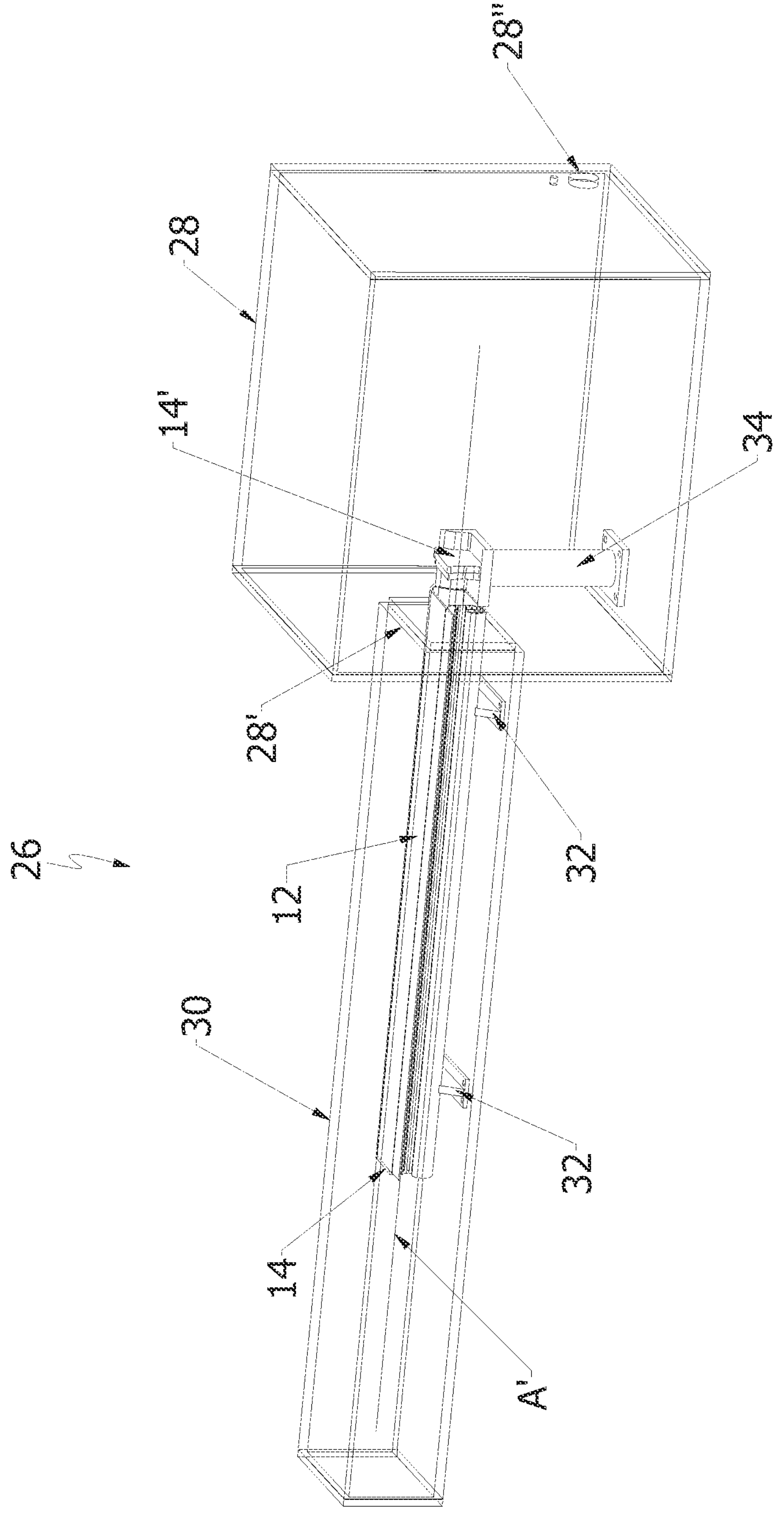
FIG. 7 is a perspective view of an apparatus for creating vacuum slates in accordance with the invention.
Figure 8:
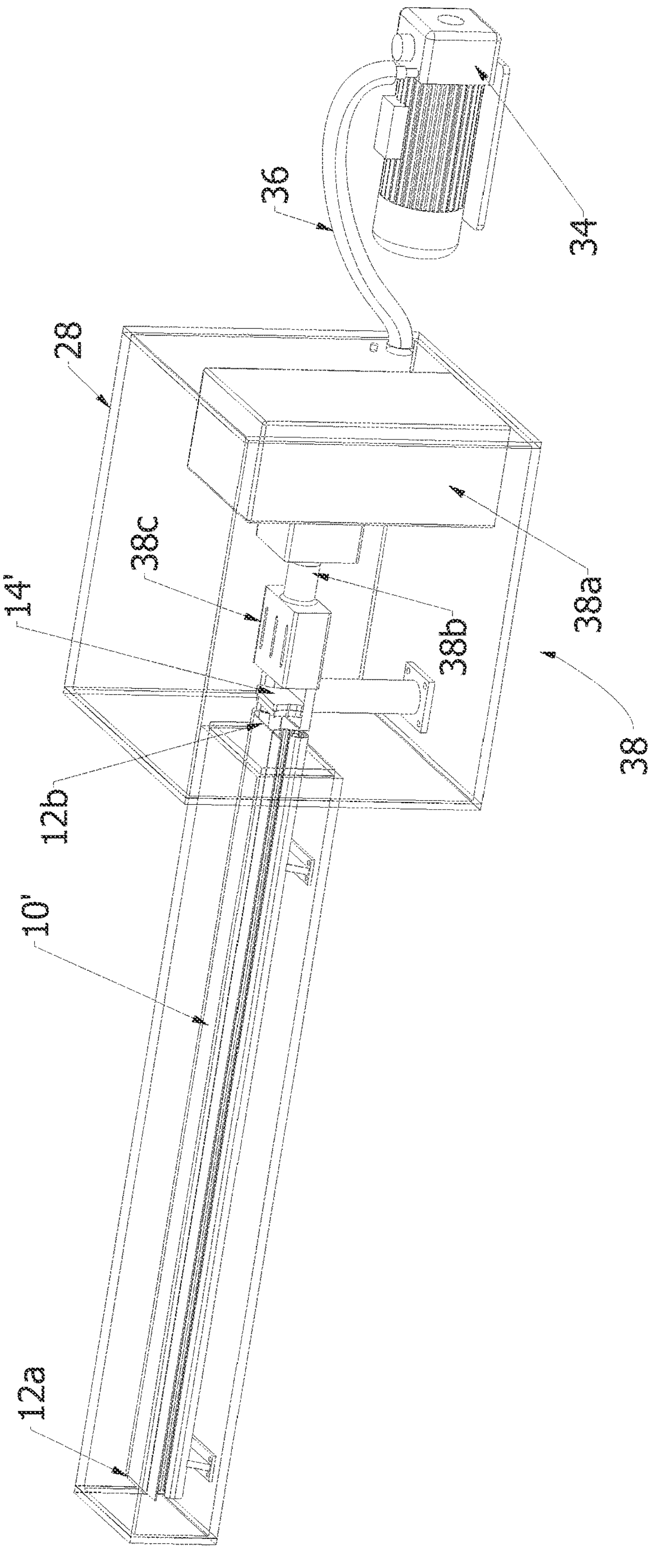
FIG. 8 is similar to FIG. 7 but also shows a vacuum pump and welding device for purging air from the chambers and welding end caps to seal a stationary slat.

The embodiments shown in FIGS. 1-6 allow the slats to be evacuated in ambient atmosphere where the slats can be assembled outside of an airtight container since the chambers or cavities are purged of air and vacuum is formed after the slats are hermetically sealed. It is also possible to create a vacuum within the slats before they are fully assembled. Referring to FIG. 7, a system or apparatus is shown that allows a vacuum to be formed within the slat 10 without the use of rubber valves mounted on the slat itself. This can be achieved by a slat assembly apparatus 26 that includes a closing or sealing station 28 and a slat receiving enclosure 30. The slat receiving enclosure 30 is an elongated chamber having a length to accommodate a slat of a predetermined length or long enough to accommodate a range of slat lengths. Slat supporting members 32 support and center or align the extruded profile 12 along an assembly axis A'. The closing or sealing station 28 has a window or opening 28' dimensioned to correspond to the cross-sectional area of the slat-receiving enclosure 30 and these are hermetically joined at the interface where the closing or sealing station is joined to the slat-receiving enclosure. A support member 34 is provided to support an end cover corresponding to any of the aforementioned end covers and to position such end cover in alignment along the axis A'. Referring to FIGS. 7 and 8 the closing or sealing station 28 is provided with an opening 28'' for evacuating air from both the chamber 28 and the slat-receiving enclosure 30. To purge air from the slat assembly apparatus a vacuum pump 34 is connected to the slat assembly apparatus by means of a hose or tube 36. Evacuation of air from the closing or sealing station 28 also evacuates air from the slat receiving enclosure 30 since these are in fluid-flow communication and a vacuum is formed throughout the apparatus 26.

Figure 7A:
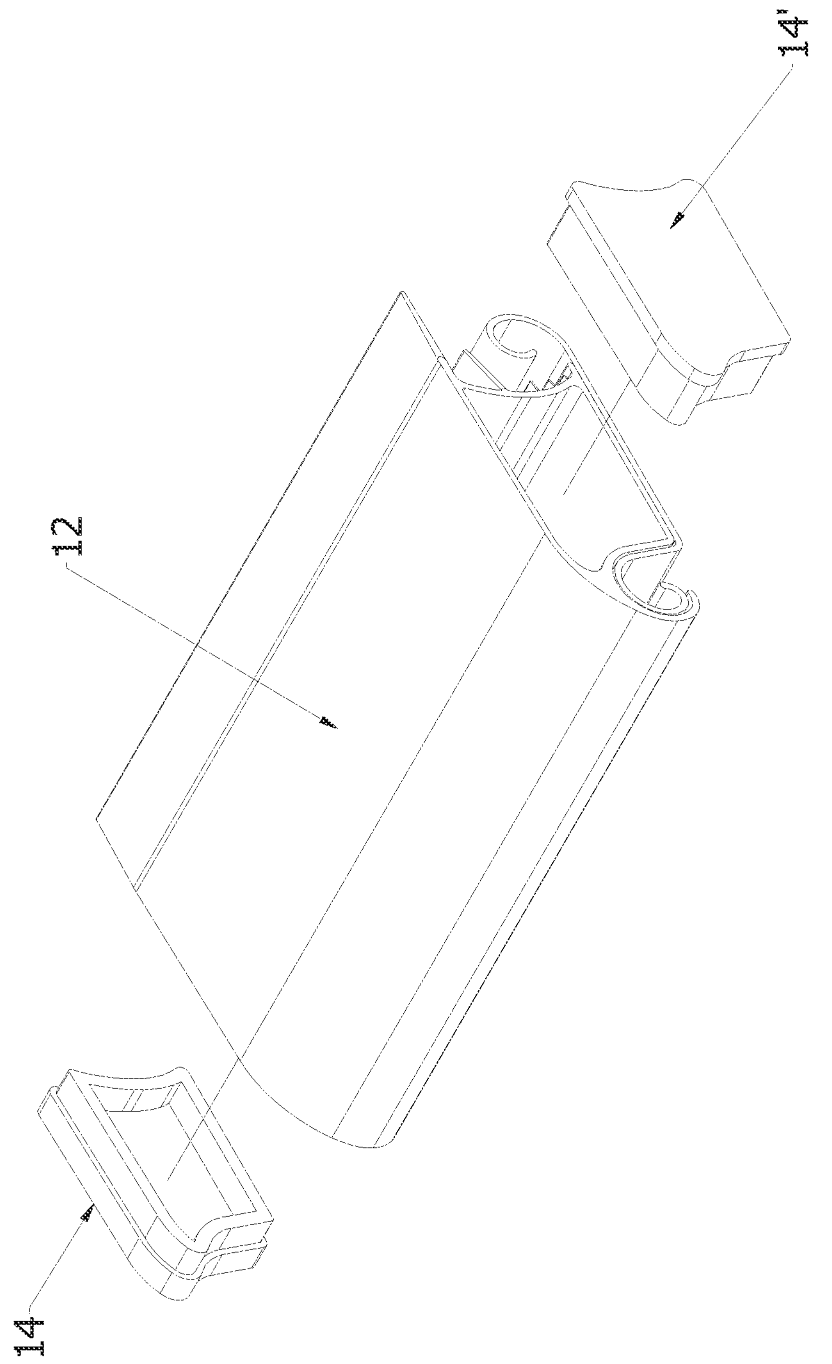
FIG. 7*a* is an enlarged view of the end cover 14' shown in FIG. 7.

In use, one end, the remote end 12*a* of the extrusion, is closed and sealed as aforementioned before being placed within the enclosure 30. When air is evacuated by the pump 34 air is also purged from the interior cavity 12*c* of the extrusion. Once the desired vacuum has been achieved within the apparatus and, therefore, within the cavity 12*c* of the extrusion, a power supply and control circuitry 38*a* includes a plunger 38*b* that supports an ultrasonic tool 38*c*. When the air has been evacuated from the extrusion the power supply and control circuitry 38*a* causes the plunger 38*b* to advance towards the extrusion and forces the end cover 14' to be inserted into the end 12*b*. After insertion, and once the end cover 14' is fully seated within the end 12*b*, the welding unit welds the end cover 14' to the end 12*b* of the extrusion. After the vacuum has been hermetically sealed it can be removed from the apparatus. The specific welding unit 38 is not critical as long as the end cap 14' can be inserted into and welded to the end 12*b*. One example of a suitable welding unit that can be used is an ultrasonic metal welder marketed by Sonics & Materials, Inc. of Newtown, CT 06470. FIG. 7*a* illustrates the end cap 14' shown in FIG. 7. The end cap 14' does have nor does it require rubber valves to evacuate the air from the extruded profile 12, the air being purged from the entire sealing chamber 28 thereby also creating a vacuum within the profile. Once a desired vacuum is created within the extruded profile the end cap 14' can be mated with and hermetically seal the profile to insure that the vacuum is maintained within the profile indefinitely.

In FIG. 8 the extruded profile is maintained stationary and serves as an anvil and it is the welding unit 38 that moves relative to the stationary extrusion. Once the cap has been inserted into the extrusion end 12*b* the welding unit 38 applies pressure between the extrusion end 12*b* and the cap 14' and vibrates to rub the two abutting surfaces one against the other under pressure causing a bond to be formed by ultrasonic welding. The specific method of hermetically sealing the slat is not critical and any other known or conventional sealing method can be used.

Figure 9:
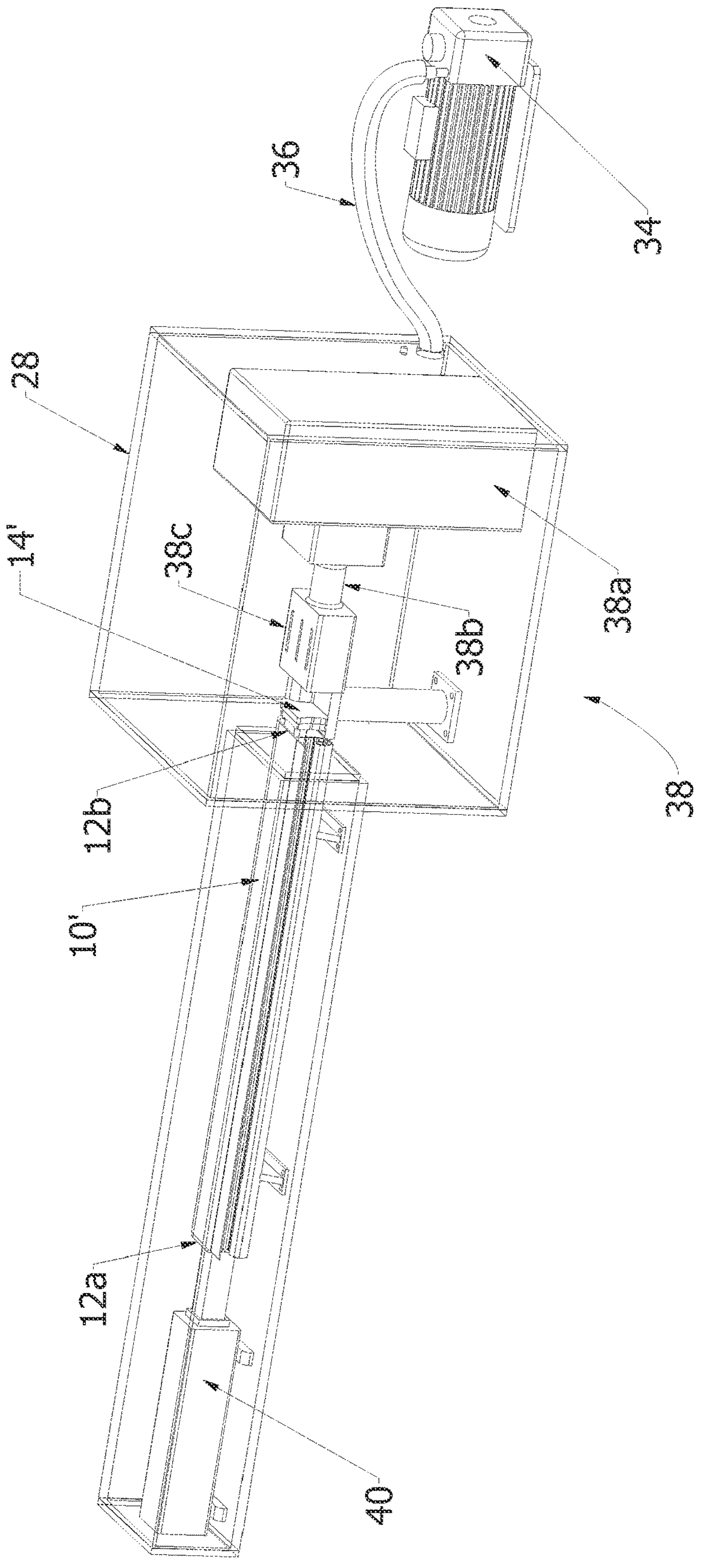
FIG. 9 is similar to FIG. 8 but shows a plunger to advance the slat towards the welding unit.

FIG. 9 illustrates a further embodiment of the invention, a variation of the embodiment shown in FIG. 8, in which the welding unit 38 is stationary and it is the extruded profile that moves. This is achieved by providing a plunger 40 that causes the extruded profile to move towards the right, as viewed in FIG. 9. The extrusion moves in alignment with the position of the end cover 14' and the ultrasonic tool 38*c* can also advance to cause insertion of the end cover into the end 12*b*. Once insertion has been completed the welding unit can be activated as aforementioned While the invention has been shown and described with reference to certain embodiments thereof, it will be understood by those skilled in the art that various changes in form and detail may be made therein without departing from the spirit and scope of the invention as defined by the appended claims and their equivalents.

The invention claimed is:

1. A method of forming a rolling door vacuum slat comprising the steps of forming an elongate member having a solid tubular wall along its length and including spaced opposing walls and open only at first and second longitudinal ends to form an internal cavity with a substantially uniform cross-sectional configuration along its length; closing said first end with a first cap; closing said second end with a second cap; evacuating air from said cavity through at least one of said first and second longitudinal ends to form a vacuum within said slat, said first and second caps having at least portions conforming to said substantially uniform cross-sectional configuration to mate with said tubular wall; and joining said first and second caps to said elongate member to form hermetic seals to render the slat airtight, whereby a vacuum insulation barrier is formed between said spaced opposing walls of said slat.

2. The method as defined in claim 1, wherein at least one of said caps has a portion conforming to said cross-sectional configuration and inserting said portion within said cavity.

3. The method as defined in claim 1, further comprising a step of reinforcing said elongate member against deformation when a vacuum is formed within said cavity by inserting ribs between said spaced opposing walls.

4. The method as defined in claim 1, wherein said elongate member is formed of metal.

5. The method as defined in claim 1, wherein said elongate member is formed of a rigid material that resists deformation when a vacuum is created within said cavity.

6. A method of forming a rolling door vacuum slat comprising the steps of placing an elongate member, having a solid tubular wall along its length and including spaced opposing walls and open only at first and second longitudinal ends to form an internal cavity with a substantially uniform cross-sectional configuration along its length within an enclosed chamber; sealing said first end with a first cap; expelling air from said enclosed chamber to form a vacuum within said enclosed chamber and within said cavity; sealing said second end with a second cap while said vacuum exists within said cavity, said first and second caps being joined to said elongate member to form hermetic seals to render the slat airtight; and removing said elongate member from said enclosed chamber, whereby a vacuum insulation barrier is formed in said slat within said cavity between said spaced opposing walls.

7. The method of forming the rolling door vacuum slat as defined in claim 6, wherein said caps are joined to said elongate member by means of ultrasonic welding.

8. The method of forming the rolling door vacuum slat as defined in claim 6, wherein said caps are joined to said elongate member by means of vibration welding.

9. The method of forming the rolling door vacuum slat as defined in claim 6, wherein said caps are joined to said elongate member by means of fusion welding.

10. The method of forming the rolling door vacuum slat as defined in claim 6, wherein said caps are joined to said elongate member by means of adhesive.

11. A method of forming a rolling door vacuum slat comprising the steps of placing an elongate member formed with a cavity with a substantially uniform cross-sectional configuration along its length and having first and second opposing open ends conforming to said cross-sectional configuration within an enclosed chamber; sealing said first end with a first cap; expelling air from said enclosed chamber to form a vacuum within said enclosed chamber and within said cavity; sealing said second end with a second cap while said vacuum exists within said cavity, said first and second caps being joined to said elongate member to form hermetic seals to render the slat airtight; advancing one of said second cap and elongate member into alignment towards each other to mate said second cap with said second end after the vacuum is established within said slat. and removing said elongate member from said enclosed chamber, whereby a vacuum insulation barrier is formed within said cavity between said spaced opposing walls.

12. The method of forming the rolling door vacuum slat as defined in claim 11, wherein said elongate member is stationary within said enclosed chamber and said second cap is advanced towards said elongate member.

13. The method of forming the rolling door vacuum slat as defined in claim 7, where said second cap is stationary within said enclosed chamber and said elongate member is advanced towards said second cap.

* * * * *